D. B. STEVENSON.
PROTECTOR FOR PNEUMATIC TIRES.
APPLICATION FILED OCT. 19, 1910.

994,210.

Patented June 6, 1911.

WITNESSES:
Thos. W. Riley
M. Newcomb

INVENTOR
D. B. Stevenson
BY
W. J. FitzGerald
Attorneys

UNITED STATES PATENT OFFICE.

DAVID B. STEVENSON, OF RANKIN, PENNSYLVANIA.

PROTECTOR FOR PNEUMATIC TIRES.

994,210. Specification of Letters Patent. Patented June 6, 1911.

Application filed October 19, 1910. Serial No. 587,904.

*To all whom it may concern:*

Be it known that I, DAVID B. STEVENSON, a citizen of the United States, residing at Rankin, in the county of Allegheny and State of Pennsylvania, have invented certain new and useful Improvements in Protectors for Pneumatic Tires; and I hereby declare the following to be a full, clear, and exact description of the invention, such as will enable others skilled in the art to which it appertains to make and use the same.

My invention relates to new and useful improvements in protectors for pneumatic tires and my object is to provide a sectional metallic shield for either the inner or outer tube of the tire.

A further object is to so arrange the sections of the protector as to conform to the contour of the tire.

A further object is to provide means for yieldingly securing the sections around the tire, and, a further object is to provide suitable air spaces through the sections to prevent the same from becoming unduly heated.

Other objects and advantages will be hereinafter set forth and pointed out in the specification.

Figure 1:
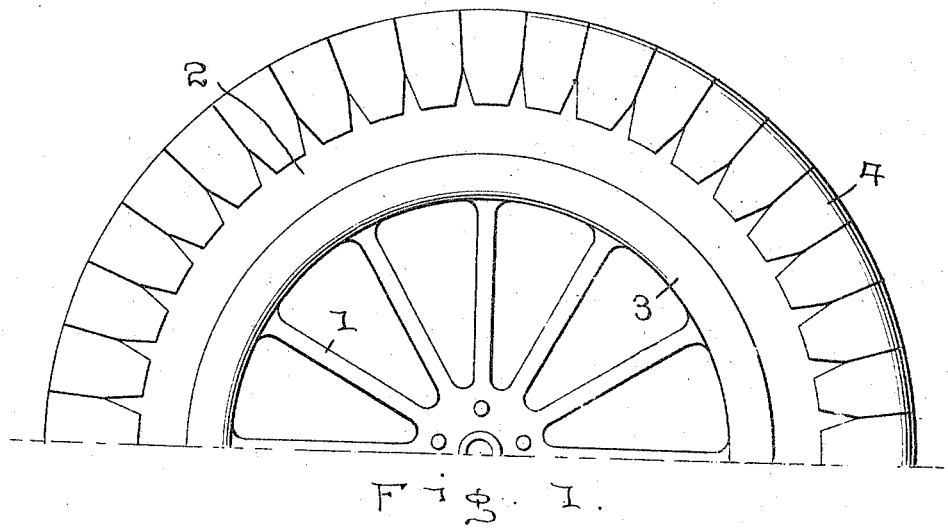
Figure 2:
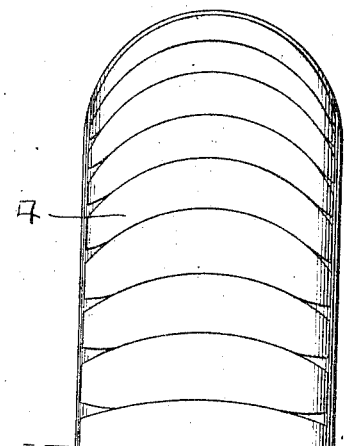
Figure 3:
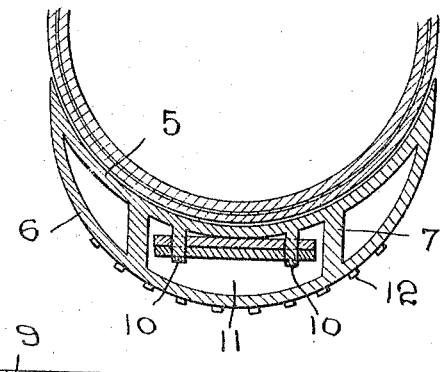
Figure 4:
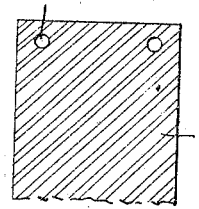

In the accompanying drawings, which are made a part of this application, Figure 1 is a side elevation of substantially one-half of a vehicle wheel, showing my improved protector applied to use thereon. Fig. 2 is an edge elevation thereof. Fig. 3 is a detail sectional view through the tire and protector, and, Fig. 4 is an elevation of one end of the band employed for holding the sections in position around the tire.

Referring to the drawings in which similar reference numerals designate corresponding parts throughout the several views, 1 indicates the wheel, which may be constructed in the usual or any preferred manner; and 2 indicates the usual form of pneumatic tire, which is mounted in the usual manner upon the felly 3 of the wheel.

In order to protect the tread surface of the outer or inner tube of the pneumatic tire, I provide my improved form of metallic protector, which consists of a plurality of sections 4, which are placed edge to edge and entirely surround the tread face of the tube of the pneumatic tire. The sections 4 are composed of an inner and outer wall 5 and 6, respectively, said walls being joined together at their ends, thereby forming the sections substantially crescent shaped in transverse section, the walls being joined by means of braces 7, dividing the space between the inner and outer walls into compartments, and when the sections are placed around the tire, said compartments provide air chambers through which air may circulate to prevent overheating of the sections. The inner wall 5, is so curved as to fit the contour of the tire or the tubes thereof, and the ends of the sections project over the surface of the tire a sufficient distance to prevent the sections from leaving the tire when the air tube is inflated.

The sections 4 are held in position around the parts of the tire by means of a flexible band or ribbon 8, the free ends of which are provided with openings 9 which engage studs 10 carried by the inner wall 5 of any one of the sections, the band 8 passing through the central compartment 11 of the sections. If desired, one or both ends of the band 8 may be provided with a number of openings 9 so that the band may be lengthened or shortened to suit tires for larger or smaller wheels.

In order to prevent slipping of the protector on the surface over which the wheels are traveling, the exterior surface of the outer walls 6 may be provided with lugs 12, or any suitable form of anti-slipping means may be provided thereon.

In applying the sections around the tubes of the tire, said tubes are deflated or the air removed therefrom, when a sufficient number of the sections 4 are introduced onto the band 8 to form a complete circle around the tube, when the tube is of normal size. The ends of the band are then introduced over the studs 10, when the inner tube of the tire is again inflated, which will cause whichever tube is engaged by the protector to enter the seat formed by curving the inner wall 5, and it will be readily seen that when the tube is properly forced into the seat, the protector will be prevented from leaving the tube so long as the inner tube is inflated. It will likewise be seen that owing to the flexibility of the band and forming the protector in sections, said sections will yield and conform to the contour of the tire as it is passing over the earth's surface. It will likewise be seen that should one of the sections become broken it can be readily replaced and at a minimum amount of trouble, as it is only necessary to deflate the tire and disengage the ends of the band when the sections on each side of the particular section having the stud may be moved farther onto the band or a sufficient distance to provide a space for a new section. It will likewise be seen that the sections can be very cheaply manufactured and that the wear thereof will be indefinite, as said sections are formed of metal, and, it will likewise be seen that by properly constructing the wearing surfaces of the sections they can be rendered practically non-slipping, thereby dispensing with the usual form of chains employed to prevent skidding of the wheels.

What I claim is:—

A protector for pneumatic tires comprising a circular series of hollow metal sections crescent shaped in cross section and connected together by integral longitudinal brace plates forming three longitudinal chambers, one of the sections being provided with integral studs projecting radially from one of its walls into the central chamber, in combination with a flexible metal band located in the continuous central chamber formed by placing the sections side by side on the tire and provided with perforations adjacent to its ends to engage upon said studs.

In testimony whereof I have signed my name to this specification in the presence of two subscribing witnesses.

DAVID B. STEVENSON.

Witnesses:
 JOHN R. FIELDHOUSE,
 MONROE SPAHM.